(12) United States Patent
Singer-Schnoeller et al.

(10) Patent No.: US 10,695,833 B2
(45) Date of Patent: Jun. 30, 2020

(54) PRESS ARRANGEMENT WITH A FURTHER PROCESSING MODULE

(71) Applicant: CERATIZIT AUSTRIA GESELLSCHAFT M.B.H., Reutte (AT)

(72) Inventors: Alexander Singer-Schnoeller, Weissenbach (AT); Markus Storf, Waengle (AT); Adrian Weber, Oy-Mittelberg (DE)

(73) Assignee: Ceratizit Austria GmbH, Reutte (AT)

( * ) Notice: Subject to any disclaimer, the term of this patent is extended or adjusted under 35 U.S.C. 154(b) by 639 days.

(21) Appl. No.: 15/030,653

(22) PCT Filed: Oct. 27, 2014

(86) PCT No.: PCT/AT2014/000194
§ 371 (c)(1),
(2) Date: Apr. 20, 2016

(87) PCT Pub. No.: WO2015/061815
PCT Pub. Date: May 7, 2015

(65) Prior Publication Data
US 2016/0263654 A1    Sep. 15, 2016

(30) Foreign Application Priority Data

Oct. 31, 2013  (AT) ................................ GM356/2013

(51) Int. Cl.
| | | |
|---|---|---|
| *B22F 3/04* | (2006.01) | |
| *B29C 43/34* | (2006.01) | |
| *B22F 3/03* | (2006.01) | |
| *B30B 11/02* | (2006.01) | |
| *B30B 15/08* | (2006.01) | |
| *B22F 3/02* | (2006.01) | |

(Continued)

(52) U.S. Cl.
CPC .................. *B22F 3/03* (2013.01); *B22F 3/02* (2013.01); *B22F 3/24* (2013.01); *B28B 1/48* (2013.01);
(Continued)

(58) Field of Classification Search
CPC .... B22F 2998/10; B22F 2998/02; B22F 3/02; B22F 2003/247
See application file for complete search history.

(56) References Cited

U.S. PATENT DOCUMENTS 4,000,231 A * 12/1976 Peterson ............... B30B 11/005
425/78
4,722,209 A    2/1988 Mankins
(Continued)

FOREIGN PATENT DOCUMENTS

CN    202805687 U    3/2013
DE    10124795 A1    12/2002
(Continued)

*Primary Examiner* — Joseph S Del Sole
*Assistant Examiner* — Thu Khanh T Nguyen
(74) *Attorney, Agent, or Firm* — Laurence A. Greenberg; Werner H. Stemer; Ralph E. Locher

(57) ABSTRACT

A press arrangement and a method for producing and processing compacts from powder material include a controller, a press frame, a pressing unit being disposed on the press frame for pressing the compact and having a die with a cavity for receiving powder material, at least two punches which, together with the cavity, provide a mold for a compact and at least one drive unit for moving at least one punch relative to the other punch along a pressing axis. A further processing module has at least one processing unit for machining a compact by metal cutting. The controller at least partially ejects or removes a compact from the die after pressing and, after the ejection holds the compact clamped between the punches. The controller uses the processing unit to process a compact being at least partially ejected from the die and held clamped between the punches.

21 Claims, 2 Drawing Sheets

(51) Int. Cl.
  *B30B 11/04* (2006.01)
  *B30B 11/00* (2006.01)
  *B22F 3/24* (2006.01)
  *B28B 1/48* (2006.01)
  *B30B 15/32* (2006.01)

(52) U.S. Cl.
  CPC ............ *B30B 11/007* (2013.01); *B30B 11/02* (2013.01); *B30B 11/04* (2013.01); *B30B 15/08* (2013.01); *B30B 15/32* (2013.01); *B22F 2003/033* (2013.01); *B22F 2003/245* (2013.01); *B22F 2003/247* (2013.01); *B22F 2998/10* (2013.01)

(56) References Cited

U.S. PATENT DOCUMENTS 6,645,426 B1 * 11/2003 Yoshihara ................ B22F 3/03 425/78

| 2007/0062023 | A1 | 3/2007 | Hall |
| 2008/0020082 | A1 | 1/2008 | Plucinski et al. |
| 2008/0196604 | A1 | 8/2008 | Menzel et al. |
| 2009/0033003 | A1 | 2/2009 | Sievers et al. |
| 2009/0169412 | A1 | 7/2009 | Samuelsson et al. |
| 2012/0225989 | A1 * | 9/2012 | Broadley .............. B29C 48/355 425/378.1 |
| 2013/0039798 | A1 | 2/2013 | Satran et al. |

FOREIGN PATENT DOCUMENTS

| DE | 102006020213 A1 | 11/2007 |
| EP | 0241833 A1 | 10/1987 |
| GB | 603123 A | 6/1948 |
| JP | S6046994 U | 4/1985 |
| JP | H07148597 A | 6/1995 |
| JP | H11320196 A | 11/1999 |
| JP | 2000071099 A | 3/2000 |
| JP | 2004345222 A | 12/2004 |
| JP | 2010007132 A | 1/2010 |
| JP | 2012152766 A | 8/2012 |

* cited by examiner

PRESS ARRANGEMENT WITH A FURTHER PROCESSING MODULE

BACKGROUND OF THE INVENTION

Field of the Invention

The invention relates to a press arrangement with a further processing module, to the use of a press arrangement and to a method for producing and processing compacts from powder material.

DE 10 2006 020 213 A1 discloses a press for producing compacts from powder material with undercuts. A die in which a mold cavity is formed by undercutting is arranged on a press frame. An upper punch and a lower punch interact with the mold cavity. The mold cavity is bounded by at least one slide, transverse pressing punch or a movable part of the die, which are displaceable transversely with respect to the vertical main pressing axis of upper and lower punch. A sensor measures the actual states of an adjustment drive for slides, transverse pressing punches and displaceable die part, wherein the actual states are compared with a desired value in a regulating apparatus.

It is the object of the invention to provide a press arrangement, the use of a press arrangement and a method, which press arrangement, use or method provides an improved processing of compacts from powder material.

BRIEF SUMMARY OF THE INVENTION

This object is achieved by the features of the invention described below.

According to the invention, a press arrangement with a further processing module for producing and processing compacts from powder material is provided. For example in order to produce compacts for cutting tools (for example index able inserts) from metallic materials, hard metal, cermet or ceramic materials. Hard metal and cermet are materials in which hard material particles are embedded in a matrix consisting of a ductile binder. The press arrangement has a press frame on or to which a pressing unit for pressing a compact from powder material is arranged or fastened.

The pressing unit has a die with a cavity for receiving powder material (to be pressed) and at least two punches which, together with the cavity, form a mold for a compact. At least one drive unit (for example driven pneumatically, electrically or hydraulically) is provided in order to move at least one punch relative to at least one second punch along a main pressing axis. If the punches are moved toward each other, pressure is exerted on a powder material poured into the cavity, and therefore the powder is compressed to form a compact. If the punches are moved apart from each other relative to each other, the compact can be removed from the pressing unit. For example, the main pressing axis is oriented vertically, and at least one upper punch and one lower punch are provided which, for the pressing, at least partially move into the cavity and compress the powder material arranged in the cavity. The die may be in single-part form, and therefore a compact is ejected downward or upward from the cavity after the pressing. Alternatively, the die may be of multi-part design, wherein, in order to eject the compact, the individual parts of the segmented die can be moved, for example, radially outward.

The press arrangement has a further processing module with at least one processing unit for machining a compact. For example, at least one drilling unit, a milling unit or a grinding unit or any combination of a plurality of identical or different processing units. The press arrangement together with the further processing module is controlled by means of a controller. The controller here may be a standard control unit of the press arrangement, which is correspondingly also designed for the further processing, or it is also possible, for example, for separate sub controllers to be provided for the pressing operation and the further processing. In the last-mentioned case, the controller therefore has a plurality of sub controllers, wherein the sub controllers may be, for example, functionally coupled to one another or else may be independent of one another. The controller (for example a first sub controller of the controller) is designed to eject a compact from the die after a pressing operation and, after the ejection, to hold said compact clamped between the at least two punches, i.e. to hold said compact with a predetermined holding force or clamping force between the punches. The at least two punches secure the position of the compact. The compact can be ejected, for example, in the discharging method, in which only the die moves downward and the punches remain in their position. An alternative thereto is the ejection method, in which the die remains stationary and the at least two punches move together upward or downward.

The controller (for example also a second sub controller of the controller) is furthermore designed to machine a compact, which is ejected from the die and is held clamped between the at least two punches, with the at least one processing unit. Apart from complete ejection prior to the beginning of the processing, it is also possible, for example, to initially only partially eject the compact from the die prior to the processing. For example, after the pressing and at least partial ejection, it is possible to introduce structures into the compact, in the case of which structures the conventional pressing technique encounters limits, such as, for example, in the case of tangential inserts with thin wall thicknesses. A further example of machining is milling, for example in order to introduce threaded bores or cooling duct bores. In particular, under cuttings and other structures can be produced retrospectively with the above-described press arrangement.

That is to say, a (complicated) segmented die is not necessary for producing under cuttings. In summary, a multiplicity of additional options are provided by the above-described further processing (prior to the sintering) to the conventional direct pressing, which could otherwise be realized, for example, only by injection molding.

During the manufacturing of powder-metallurgical products, the shape of the (end) product is produced by the pressing by the powder being compacted to form a compact or green compact. Only during the subsequent sintering of the compact is a firm bond between the compressed powder grains produced. That is to say, after the pressing (prior to the sintering) the compact is sensitive to mechanical damage. In the case of the above-described press arrangement with a further processing module, the compact is processed in the press arrangement directly subsequently to the pressing operation without the compact having to be clamped, and therefore the risk of damage is significantly reduced.

The effective force, i.e. the holding or clamping force, which clamps the compact can be provided by the drive unit of the press arrangement. The clamping force, which is produced, for example, pneumatically, electrically or hydraulically and acts on the compact via the at least two punches, can be controlled and/or regulated via the controller, for example, directly via a selected force. The at least one processing unit preferably has a drilling unit, a milling unit or a grinding unit. For example, two processing units are provided on opposite sides of the (main) pressing axis in order to process the compact on two sides in a time-saving manner. Alternatively or additionally, at least one processing unit has a tool carrier which can be equipped with different tools, and therefore a compact can be flexibly processed with a plurality of tools by just one processing unit.

The further processing module is preferably arranged on or fastened to the press frame. As a result, a secure connection of the further processing module to the press arrangement is provided. Alternatively, the further processing module has a module basic body or a module frame for the mounting of the at least one processing unit. The module frame can be arranged or erected, for example, next to the press frame. As a result, the further processing module for processing a compact can be arranged on a freely selectable side of the pressing unit as required.

The further processing module preferably has at least one manipulator or a robot arm, at the working end of which the at least one processing unit is arranged. The manipulator, for example a pivotable and/or extendable arm, can be mounted on the press frame or module basic body and can be controlled by means of the controller. The manipulator can be, for example, of 6-axis design or has six degrees of freedom, and therefore the processing unit can be advanced at any angles to a clamped compact. For example, the manipulator can be arranged on a linear guide or on an annular guide around the main pressing axis, and therefore said manipulator can simply be advanced to a clamped compact.

The further processing module preferably has at least one drive unit and at least one guide unit for advancing the at least one processing unit to a clamped compact. For example, a guide unit is designed as a linear guide with a carriage on which a drilling unit is fastened. For example, a drive unit driven hydraulically, electrically or pneumatically is provided.

According to a preferred refinement, the further processing module has a first guide unit for moving the at least one processing unit in a first direction, and a second guide unit for moving the at least one processing unit in a second direction not running parallel to the first direction. As a result, the processing unit is freely movable in a plane, for example the X-Y plane perpendicular to the main pressing axis. With such a 2-way-controlled processing unit it is possible, for example, for a compact to be processed at a height.

If, for example, a pressing unit is provided in which a compact is ejected upward or downward from the die (in the direction of the main pressing axis or in the Z direction) by means of the punch, a clamped compact can be processed at any height by a combined movement of the two punches or of the compact in the Z direction and guidance in the X-Y plane. For example, a bore can be produced at any desired (accessible) location. Alternatively, the processing plane is arranged at any angle to the main pressing axis. For example, the processing plane runs parallel to the main pressing axis or a guide unit provides movability in the direction of the main pressing axis (Z axis).

The further processing module preferably has a third guide unit for moving the at least one processing unit in a third direction not running parallel to the first and second direction. For example, in a third direction perpendicular to the first and second direction, and therefore, as described above, a compact be processed at any height.

The further processing module particularly preferably has a pivoting joint in order to pivot the at least one processing unit about a pivot axis. For example, about a pivot axis perpendicular to the pressing axis. As a result, a clamped compact can be processed at any adjustable angle.

The further processing module preferably has a rotation guide which is mounted on the press frame and on which the at least one processing unit is arranged. By means of the rotation guide, the processing unit is mounted rotatably about the main pressing axis, and therefore the processing unit can be advanced in a revolving manner to a compact at any location. The rotation axis is preferably formed parallel to the pressing axis.

According to a preferred refinement, the further processing module has at least two processing units which can be advanced to a compact. Two processing units which are arranged diagonally or symmetrically opposite each other with respect to the pressing axis are advantageously provided, and therefore a compact can be processed rapidly and effectively simultaneously from both sides or from a plurality of sides. For example, a first region of a clamped compact can be processed by means of the first processing unit, while a second region of the compact that is offset axially with respect to the first processing region can be processed with the second processing unit.

The further processing module particularly preferably has a first guide unit, a second guide unit, a third guide unit, a rotation guide and/or a pivoting joint for each of the at least two processing units in order to move the at least two processing units independently of one another or to advance same to a compact independently of one another. Alternatively, the further processing module has at least one common guide unit for the at least two processing units in order to move the at least two processing units jointly in at least one direction. For example, a common linear guide is provided with a common carriage on which guide two processing units are arranged on opposite sides of the compact or of the main pressing axis. In this refinement, for example, the two processing units can be designed as drilling units in order to manufacture a bore through the compact.

In a first step, a drilling unit can drill into the compact from a first side without drilling completely through the compact. Subsequently, the passage bore can be completed from the opposite side with the second drilling unit. Since the passage bore is not manufactured from one side, it is ensured that the inlet opening of the passage bore is formed neatly and distinctly on both sides. If the drilling axes of the two drilling units are aligned with each other, a bore can be produced rapidly and neatly in a compact by simple movement sequences (with the common linear guide).

The press arrangement preferably has a handling device which is arranged on the press frame or on a guide unit and has at least one gripper for gripping a compact. For example, the gripper or the grippers of the handling device can be advanced by means of an actuator device to a compact clamped between the punches, wherein in particular the gripper or the grippers of the handling device is or are arranged on a pivotable and/or extendable arm or on a manipulator. For example, after the processing of the compact, an upper punch moves upward and the further processed compact can be removed by means of the handling device for subsequent sintering.

A method for producing and processing compacts from powder material is described below. The method can be carried out with a press arrangement as described above.

The method has the following steps: pouring a powder material into a cavity of a die, pressing the powder material by means of at least two punches in the direction of a pressing axis to form a compact, at least partially ejecting the compact from the cavity, wherein the compact is held between the at least two punches, and machining the compact by means of at least one processing unit while the compact is held between the at least two punches. The advantages described in conjunction with the press arrangement arise by means of the method.

Preferably, in order to eject the compact, the die is moved downward or the at least two punches are moved upward. Alternatively, in order to eject the compact, the die is moved upward or the at least two punches are moved downward together. That is to say, after the ejection, the die is located above or below the compact, and therefore the sides of the compact are freely accessible for the processing.

After the machining, the compact is preferably grasped by means of a handling device with grippers, after at least one of the two punches has moved away from the compact, and therefore the compact can be taken out of the pressing unit by means of the handling device. Alternatively, it is also possible for the compact to first of all be grasped by the handling device and for at least one of the two punches to only subsequently move away. The compact can be deposited into a store, for example for further transport.

Individual features of the embodiments described above and below of the press arrangement and of the method for producing and processing compacts can be combined with one another in any manner.

BRIEF DESCRIPTION OF THE SEVERAL VIEWS OF THE DRAWING

An embodiment of the invention is explained in more detail with reference to the figures, in which.

DESCRIPTION OF THE INVENTION

Figure 1A:
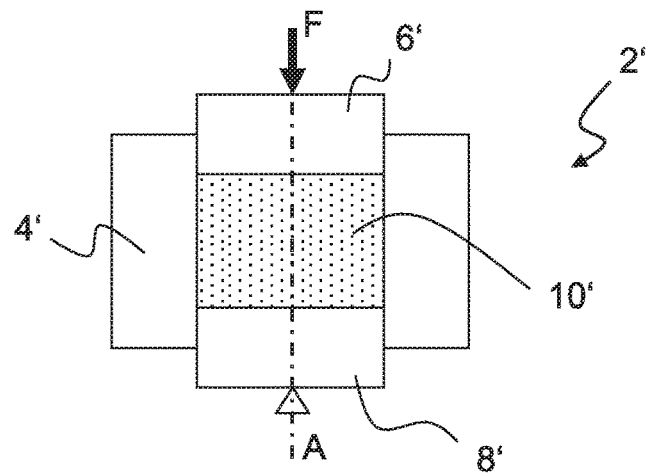
FIGS. 1a-b show a schematic side view of a pressing unit of a press arrangement.
Figure 1B:
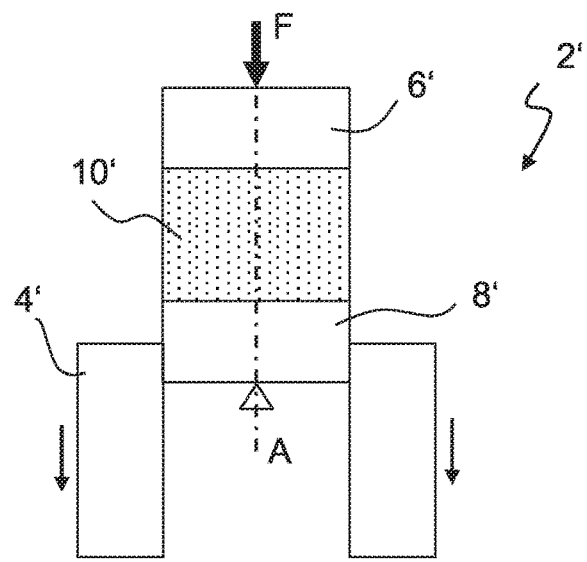

FIGS. 1a-b show a schematic side view of part of a pressing unit 2' of a press arrangement with a further processing module. The pressing unit 2' has a die 4' with a cavity into which powder material is poured and a press frame 15 shown in FIGS. 2a-c. A mold for a compact 10' is provided by means of an upper punch 6' and lower punch 8' together with the cavity of the die 4'. Examples of usable powder materials are metal powder or hard metal or cermet compositions, in particular for tools, such as, for example, indexable inserts. The methods described below for producing and processing a compact with the press arrangement can be controlled by means of a controller 17 shown in FIGS. 2a-c.

In FIG. 1a, the pressing unit 2' is depicted during a pressing operation in which the upper punch 6' is moved by means of a drive unit 18 along a main pressing axis A toward the fixed lower punch 6', and therefore pressure is exerted on the powder material and the powder material is compressed to form a compact 10'. As indicated in FIG. 1b by arrows, after the pressing operation the die 4' is moved downward, and therefore the sides of the compact 10' are exposed. During the ejection of the compact 10', the compact 10' is held clamped by the two punches 6', 8'. A load F on the compact 10' is maintained and secures the position of the compact 10' in the pressing unit 2'. The effective force which clamps the compact 10' is produced by the drive unit. The holding force or clamping force which is produced, for example, pneumatically, electrically or hydraulically and acts on the compact 10' via the at least two punches 6', 8' can be controlled and/or regulated via the controller, for example directly via a selected force.

Figure 2A:
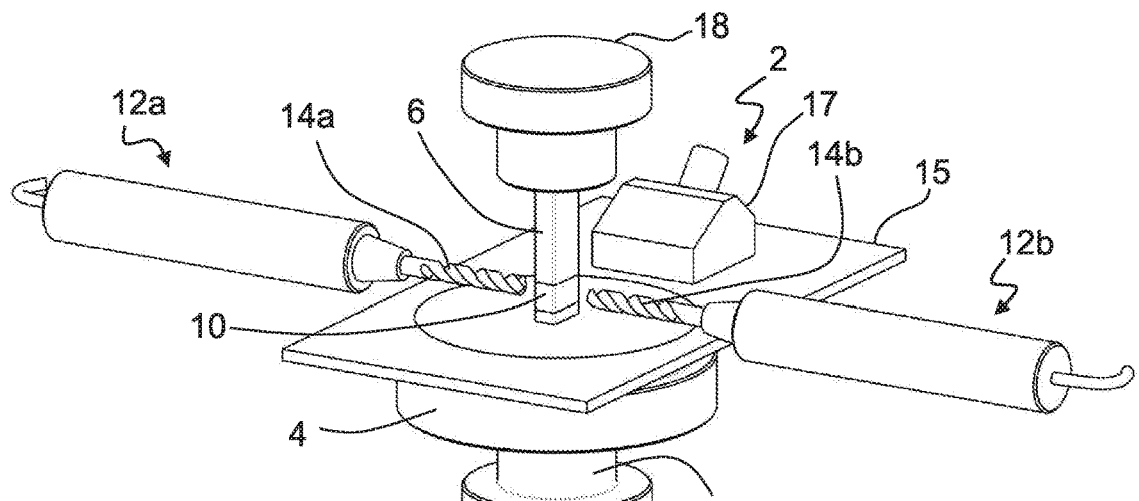
FIGS. 2a-c show perspective side views of part of a press arrangement with a further processing module during the further processing of a compact.
Figure 2B:
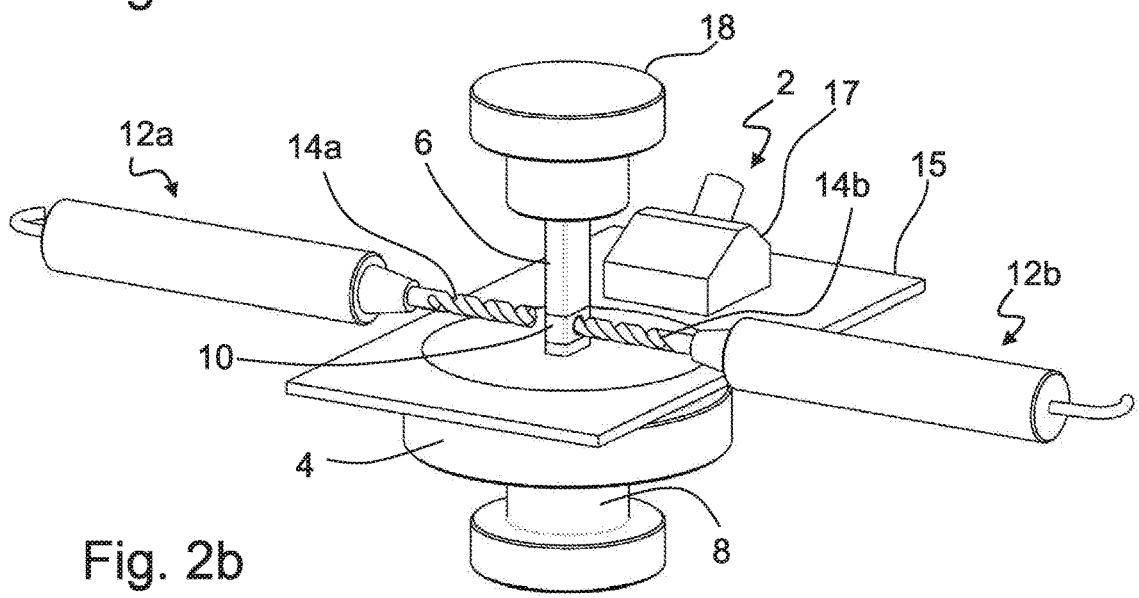
Figure 2C:
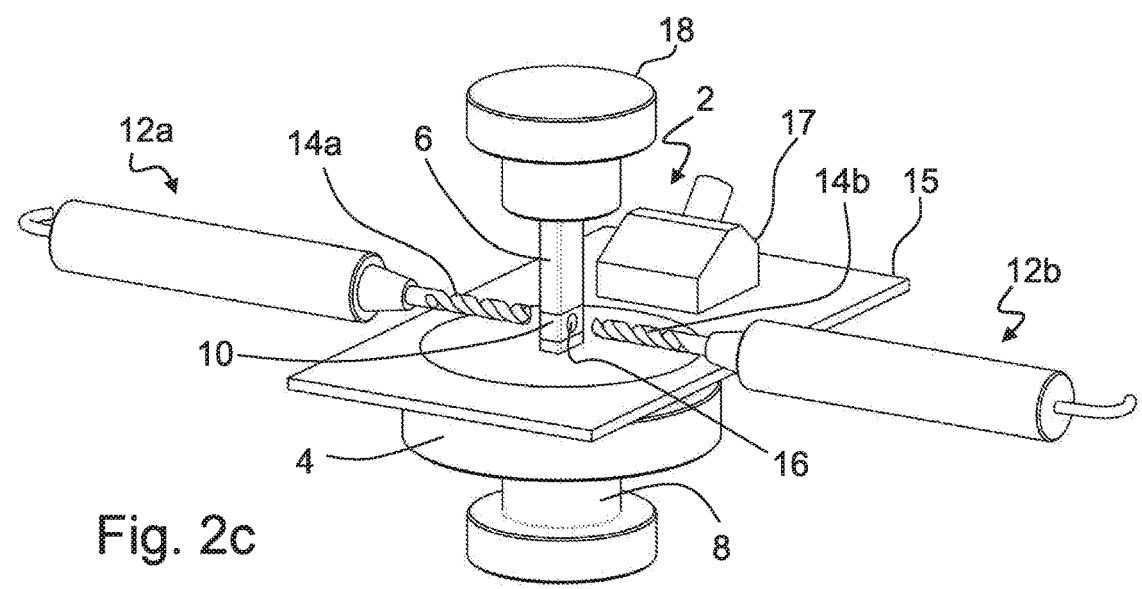

FIGS. 2a-c show perspective side views of part of a press arrangement with a further processing module. Elements having the same functions as described above have the same reference signs.

FIG. 2a shows a compact 10 after the ejection from the die 4. As described above, the compact 10 is clamped between the upper and the lower punch 6, 8 and the sides of said compact are freely accessible after the ejection for further processing. Alternatively to the example illustrated, it is also possible, depending on the processing to be undertaken, only partially to eject the compact 10 prior to the subsequent processing.

In this refinement, the further processing module has two drilling units 12a-b with drills 14a-b which are arranged on opposite sides of the compact 10 or of the main pressing axis A. The drills 14a-b of the drilling units 12a-b are aligned axially with one another, and therefore a passage bore 16 can be produced in the compact 10 by the two drills 14a-b, as described below.

Figure 3:
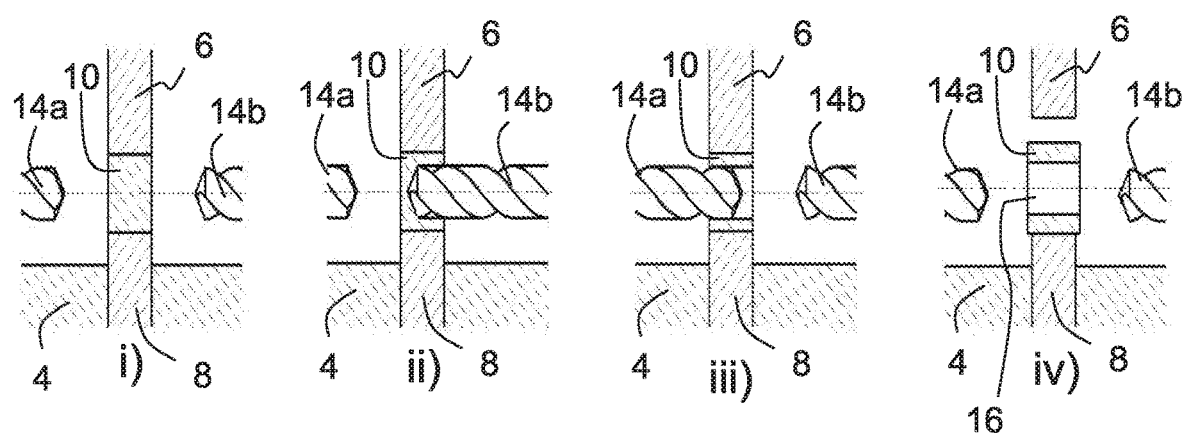
FIG. 3 shows a detail of the press arrangement from FIGS. 2a-c for depicting the further processing of the compact in four steps i) to iv).

FIG. 3 schematically illustrates the sequence i)-iv) during the production of the passage bore 16, in a lateral sectional view. The drilling units 12a-b are each arranged on a linear guide, and therefore each drilling unit 12a-b can be advanced to the compact 10 independently of the other drilling unit 12a-b. In a first step, the compact is initially drilled from one side with a first drilling unit 12b, but is not drilled through (FIG. 3 ii), FIG. 2b). Subsequently, the first drilling unit 12b or the drill 14b is removed again from the bore 16 (FIG. 2c) and, by means of the second drilling unit 12a or the second drill 14a, the bore is completed or a passage bore 16 is produced from the opposite side (FIG. 3 iii)). This method prevents parts of the compact 10 from crumbling away on the outlet side of the drill 12b during the complete drilling through of the compact, and it is ensured that the two drill hole edges are defined neatly and distinctly. As illustrated in FIG. 3 iv), after the bore 16 is completed the upper punch 6 is moved upward, and therefore the processed compact 10 can be removed from the pressing unit 2. The further processed compact 10 can subsequently be sintered.

Alternatively, the two drilling units 12a-b can be arranged on a common linear guide or on a common carriage, and therefore the second drilling unit is removed from the compact during the advancing of a first drilling unit to the compact.

LIST OF REFERENCE SIGNS 2, 2' pressing unit
4, 4' die
6, 6' upper punch
8, 8' lower punch
10, 10' compact/powder material
12a-b drilling unit
14a-b drill
16 bore
A main pressing axis
F load/pressing pressure

The invention claimed is:

1. A press arrangement for producing and processing compacts formed of powder material, the press arrangement comprising:
   a press frame;
   a pressing unit disposed on said press frame for pressing a compact from powder material, said pressing unit having a pressing axis, a die with a cavity for receiving powder material, at least two punches providing a mold for a compact together with said cavity, and at least one drive unit for moving at least one of said punches relative to at least another of said punches along said pressing axis;
   a further processing module having at least one processing unit at least one of drilling, milling or grinding an unsintered compact, said at least one processing unit having a drilling unit, a milling unit, a grinding unit or a tool carrier; and
   a controller at least partially electing an unsintered compact from said die after a pressing operation and holding said unsintered compact clamped between said at least two punches after the at least partial ejection;
   said controller using said at least one processing unit to machine an unsintered compact being at least partially ejected from said die and held clamped between said at least two punches.

2. The press arrangement according to claim 1, wherein said further processing module is disposed on said press frame.

3. The press arrangement according to claim 1, wherein said further processing module has a manipulator with a working end, and said at least one processing unit is disposed at said working end.

4. The press arrangement according to claim 1, wherein said further processing module has at least one guide unit for advancing said at least one processing unit to a clamped compact.

5. The press arrangement according to claim 1, wherein said further processing module has a first guide unit for moving said at least one processing unit in a first direction and a second guide unit for moving said at least one processing unit in a second direction not being parallel to said first direction.

6. The press arrangement according to claim 5, wherein said second direction is perpendicular to said first direction.

7. The press arrangement according to claim 5, wherein said further processing module has a third guide unit for moving said at least one processing unit in a third direction not being parallel to said first and second directions.

8. The press arrangement according to claim 7, wherein said third direction is perpendicular to said first and second directions.

9. The press arrangement according to claim 1, wherein said further processing module has a pivot joint for pivoting said at least one processing unit about a pivot axis.

10. The press arrangement according to claim 9, wherein said pivot axis is perpendicular to said pressing axis.

11. The press arrangement according to claim 1, wherein said further processing module has a rotation platform mounted on said press frame and being rotatable about said pressing axis, said at least one processing unit being disposed on said rotation platform.

12. The press arrangement according to claim 1, wherein said at least one processing unit is at least two processing units configured to be advanced to a compact.

13. The press arrangement according to claim 12, wherein said at least two processing units are two processing units disposed diagonally or symmetrically opposite each other relative to said pressing axis.

14. The press arrangement according to claim 1, wherein each of said at least two processing units has a first guide unit, a second guide unit, a third guide unit, and at least one of a rotation guide or a pivoting joint for advancing said at least two processing units independently of one another to a clamped compact.

15. The press arrangement according to claim 1, wherein said further processing module has at least one common guide unit for moving said at least two processing units jointly in one direction, and each of said at least two processing units has at least one of a rotation guide or a pivoting joint for advancing said at least two processing units independently of one another to a clamped compact.

16. The press arrangement according to claim 4, which further comprises a handling device disposed on said press frame or on said guide unit and having at least one gripper for gripping a compact.

17. The press arrangement according to claim 16, which further comprises an actuator device for advancing said at least one gripper to a compact clamped between said punches.

18. The press arrangement according to claim 17, which further comprises an arm being at least one of pivotable or extendable, said at least one gripper being disposed on said arm.

19. A method for producing and processing compacts formed of powder material, the method comprising the following steps:
   pouring a powder material into a cavity of a die;
   pressing the powder material by using at least two punches in a direction of a pressing axis to form a compact;
   at least partially ejecting the unsintered compact from the cavity, while holding the unsintered compact clamped between the at least two punches; and
   at least one of drilling, milling or grinding the unsintered compact by using at least one processing unit while the compact is held clamped between the at least two punches, the at least one processing unit having a drilling unit, a milling unit, a grinding unit or a tool carrier.

20. The method according to claim 19, which further comprises:
   ejecting the compact by moving the die downward or moving the at least two punches upward; or
   ejecting the compact by moving the die upward or moving the at least two punches downward.

21. The method according to claim 19, which further comprises, after the machining, carrying out the following steps:
   moving at least one of the two punches away from the compact;
   gripping the compact by using a handling device with grippers; and removing the compact by using the handling device.

* * * * *